US009098001B2

(12) United States Patent
Tashiro et al.

(10) Patent No.: US 9,098,001 B2
(45) Date of Patent: Aug. 4, 2015

(54) SURFACE-MODIFIED METAL OXIDE POWDER AND PROCESS FOR PRODUCING SAME

(75) Inventors: Hideaki Tashiro, Mie (JP); Akira Inoue, Mie (JP)

(73) Assignee: NIPPON AEROSIL CO., LTD., Tokyo (JP)

( * ) Notice: Subject to any disclaimer, the term of this patent is extended or adjusted under 35 U.S.C. 154(b) by 374 days.

(21) Appl. No.: 13/378,691

(22) PCT Filed: Jul. 9, 2010

(86) PCT No.: PCT/JP2010/061701
§ 371 (c)(1),
(2), (4) Date: Dec. 16, 2011

(87) PCT Pub. No.: WO2011/007731
PCT Pub. Date: Jan. 20, 2011

(65) Prior Publication Data
US 2012/0085978 A1   Apr. 12, 2012

(30) Foreign Application Priority Data

Jul. 14, 2009   (JP) ................................. 2009-165180

(51) Int. Cl.
*H01B 1/02*   (2006.01)
*H01B 1/12*   (2006.01)
*G03G 9/097*   (2006.01)
*C01B 13/18*   (2006.01)
*C01B 33/18*   (2006.01)
*C09C 1/30*   (2006.01)

(52) U.S. Cl.
CPC ............ *G03G 9/09716* (2013.01); *C01B 13/18* (2013.01); *C01B 13/185* (2013.01); *C01B 33/18* (2013.01); *C09C 1/3063* (2013.01); *C09C 1/3072* (2013.01); *C09C 1/3081* (2013.01); *G03G 9/09725* (2013.01); *C01P 2006/12* (2013.01); *C01P 2006/40* (2013.01); *C01P 2006/80* (2013.01)

(58) Field of Classification Search
CPC .... G03G 9/0823; C01B 33/14; C01B 33/141; C01B 33/145; C01B 33/149
USPC .............. 252/519.2; 430/108.1, 108.3, 108.6, 430/111.1; 556/9, 428
See application file for complete search history.

(56) References Cited

U.S. PATENT DOCUMENTS

| 6,124,071 A * | 9/2000 | Lin et al. ................... 430/108.3 |
| 2005/0147909 A1 | 7/2005 | Ueno et al. |
| 2009/0047518 A1 | 2/2009 | Sawada et al. |
| 2009/0203820 A1 | 8/2009 | Sawada et al. |

FOREIGN PATENT DOCUMENTS

| JP | 5-339306 | 12/1993 |
| JP | 2001-281914 | 10/2001 |
| JP | 2002-154820 | 5/2002 |
| JP | 2003-192940 | 7/2003 |
| JP | 2003-316084 | 11/2003 |
| JP | 2004-107529 | 4/2004 |
| JP | 2004-231498 | 8/2004 |
| JP | 2005-37909 | 2/2005 |
| JP | 2006-193704 | 7/2006 |
| JP | 2007-156400 | 6/2007 |
| JP | 2007-226079 | 9/2007 |
| JP | 2007-270124 | 10/2007 |
| JP | 2009-093053 | 4/2009 |
| JP | 2009-133973 | 6/2009 |
| JP | 2009-155435 | 7/2009 |
| JP | 2009-157079 | 7/2009 |
| JP | 2009-209349 | 9/2009 |

OTHER PUBLICATIONS

Chinese Office Action for CN Application No. 201080017565.0, mailed on Jun. 5, 2013; and an English translation thereof.
International Preliminary Report on Patentability for PCT/JP2010/061701, mailed Mar. 13, 2012.
Wang et al., "Surface confined ionic liquid as a stationary phrase for HPLC", The Analyst, 2006, 131 pp. 1000-1005.
Chung et al., "Microcantilever Sensors with Chemically Selective Coatings of Ionic Liquids", AIChE Journal, 2007, 53(10), pp. 2726-2731.
Ohtani, "Charge Control Technology in the Toner Surface", The Journal of the Surface Finishing Society of Japan, 2005, pp. 442-446.
Oguchi et al., "Funtai no Sesshoku Taiden to sono Oyo", Oyo Butsuri, Aug. 10, 1983, pp. 674-679.
International Search Report for PCT/JP2010/061701, Dated: Oct. 12, 2010.
Office Action issued with respect to patent family member German Patent Application No. 11 2010 002 932.6, mailed Feb. 8, 2013, and English-language translation thereof.
Wang et al., "Surface confined ionic liquid as a stationary phase for HPLC", The Analyst, vol. 131, pp. 1000-1005 (Jul. 21, 2006).
Japanese Office Action for JP Application No. 2011-522795, which was mailed on Jun. 10, 2014; along with an English translation thereof.

(Continued)

*Primary Examiner* — Khanh Tuan Nguyen
(74) *Attorney, Agent, or Firm* — Greenblum & Bernstein, P.L.C.

(57) ABSTRACT

Provided is a surface-modified metal oxide powder obtained by treating a surface of a metal oxide powder, wherein a ratio (A/B) of an initial triboelectrostatic charge amount (A) at a time of one minute after dispersion of the surface-modified metal oxide powder into a ferrite carrier to a triboelectrostatic charge amount (B) after a lapse of 30 additional minutes is from 1.0 to 2.0, and the triboelectrostatic charge amount (B) is from −300 to +300 µC/g. The surface-modified metal oxide powder has a weaker charging property and a better stability over time of a triboelectrostatic charge amount than a conventional one; and thus, when this powder is used as an external additive, various properties including flowability and electrical charging can be stabilized, and in addition, problems such as fogging and image deterioration can be drastically remedied without significantly deteriorating characteristics as a developer and the like.

13 Claims, No Drawings

(56) References Cited

OTHER PUBLICATIONS

Office Action for Chinese Patent Application 201080017565.0, mailed on Feb. 20, 2014; along with an English translation thereof.
Office Action issued with respect to Chinese Patent Application No. 201080017565.0 mailed Oct. 11, 2014; with an English Translation thereof.
Office Action for Japanese Patent Application No. 2011-522795, which was mailed on Mar. 17, 2015; along with an English translation.
Partial translation of Ohtani, "Charge Control Technology in the Toner Surface", The Journal of the Surface Finishing Society of Japan, 2005, pp. 442-446. (Japanese language document was previously cited and submitted on Mar. 16, 2012.).
Partial translation of Oguchi et al., "Funtai no Sesshoku Taiden to sono Oyo", Oyo Butsuri, Aug. 10, 1983, pp. 674-679. (Japanese language document was previously cited and submitted on Mar. 16, 2012.).
German Office Action for patent application 11 2010 002 932 6, mailed May 11, 2015, along with an English translation thereof.

* cited by examiner

SURFACE-MODIFIED METAL OXIDE POWDER AND PROCESS FOR PRODUCING SAME

TECHNICAL FIELD

The present invention relates to a surface-modified metal oxide powder—used suitably as an external additive added into a powder paint, an electrophotographic toner, or the like, to improve a powder flowability, prevent caking, control a frictional charging property, or the like, or as a conductivity-imparting material to impart conductivity to various semiconductive members including a synthetic resin member, a rubber member, an antistatic film, and a coating material, thereby affording an antistatic property thereto—and to a method for producing the same. In more detail, the present invention relates to a surface-modified metal powder—having not only a weak charging property but also an excellent stability over time of a triboelectrostatic charge amount, and in addition, capable of affording adequate and stable conductivity when added to a resin and the like—and to a method for producing it.

BACKGROUND ART

From the past, in an electrophotographic field such as a copying machine, a laser printer, and a plain-paper fax machine, a surface-modified metal oxide powder, obtained by treating surface of a metal oxide powder such as fine silica, titania, and alumina with an organic substance, has been widely used as an external additive to improve a toner flowability or to control a frictional charging property.

In the past, it has been disclosed that a surface-modified metal microparticle—having a stabilized frictional charging property obtained by surface treatment concurrently using, together with a hydrophobizing agent, an amine-containing silane coupling agent to control a charge and other amine-containing silane coupling agent to increase stability of a triboelectrostatic charge amount—has been disclosed as the external additive mentioned above (for example, see Patent Document 1). Further, a surface-modified silica microparticle—wherein, the surface thereof has been treated, in the presence of an amine catalyst, with an alkyl (with the size of equal to or smaller than a hexyl group) alkoxy silane with the amount thereof relative to the silica microparticle, an amount of water, and temperature and time of the reaction being controlled so that change of a triboelectrostatic charge amount with an elapse of time after the surface treatment (A/B), may be 1.0 to 2.0—is disclosed (for example, see Patent Document 2).

On the other hand, a synthetic resin is being used in many fields including an electric appliance such as a television, an automobile part, a precision instrument such as an optical lens, an optical disk, an organic glass plate, and a signboard, wherein the synthetic resin has merits in its excellent lightness and strength as compared with a glass product and the like, while it has demerits of easily taking an electrical charge and adhering dust and the like thereto. To solve these problems, a countermeasure has been taken such as to impart conductivity to a member itself by producing the member by using a semiconductive material of a composition added with a conductive additive and to impart an antistatic property onto surface of the member by arranging a film or a coat material obtained by using the foregoing semiconductive material.

As to a method for imparting conductivity, a method using a photo-curable resin composition—concurrently using, for example, an imidazoline surfactant and a salt such as an alkaline metal salt, an alkaline earth metal salt, and an ammonium salt—has been disclosed (see for example, Patent Document 3). Alternatively, a method wherein a conductive inorganic particle such as ATO (tin oxide doped with antimony pentaoxide) is added to an organic binder, and a method using a composition for an antistatic hard coat added with the inorganic particle obtained by treating surface of the foregoing inorganic particle with a silane coupling agent have been disclosed (see for example, Patent Document 4). Still alternatively, a method wherein an onium salt is contained in a resin composition by adding an ionic liquid of various kinds thereto has been investigated (see for example, Patent Document 5).

Patent Documents

Patent Document 1: Japanese Patent Laid-Open Publication No. 2001-281914 (claim 2 and paragraph [0006])
Patent Document 2: Japanese Patent Laid-Open Publication No. 2004-231498 (claim 3 and paragraph [0012])
Patent Document 3: Japanese Patent Laid-Open Publication No. H05-339306 (claim 1 and paragraphs [0018] and [0019])
Patent Document 4: Japanese Patent Laid-Open Publication No. 2004-107529 (claim 1 and paragraph [0015])
Patent Document 5: Japanese Patent Laid-Open Publication No. 2006-193704 (claim 1)

DISCLOSURE OF INVENTION

Problems to be Solved by the Invention

However, in the field of an external additive to improve a toner flowability or to control a frictional charging property, a conventional, surface-modified metal oxide microparticle shown in Patent Document 1 has been insufficient in stability over time of a frictional charging property, though excellent at the initial period. That is, stability over time of a triboelectrostatic charge amount is guaranteed for about 5 minutes of friction time, while there is no description with regard to stability over time thereafter. In addition, when surface treatment is done by using an amine-containing silane coupling agent, sometimes there is a problem that oxidation progresses thereby leading to coloration and decomposition of the powder. In a conventional, surface-modified silica microparticle shown in Patent Document 2, similarly to the invention of Patent Document 1, it cannot be said that stability over time of a triboelectrostatic charge amount was adequate. That is, in a surface-modified silica microparticle shown in Patent Document 2, stability over time of a triboelectrostatic charge amount is guaranteed for about 30 minutes of friction time; but this stability over time of a triboelectrostatic charge amount is based on evaluation of the microparticle added to a toner, and thus it does not show that the same stability over time can be obtained in the case that the microparticle is mixed with a carrier.

On the other hand, in the foregoing technology field relating to an antistatic measure of a synthetic resin member and so on, in the case that an ionic conductive material is added as an antistatic agent as disclosed in Patent Document 3, variance of an electric resistivity due to change of an environmental condition such as temperature and humidity is large, i.e., low in an environmental resistance, and in addition, bleed-out of the ionic conductive material occurs depending on compatibility thereof with other materials such as a rubber and a resin, thereby causing a problem of not giving a stable electric resistivity over time. Furthermore, in the method wherein the inorganic particle is added as mentioned above, affinity between the inorganic particle and an organic material such as a binder is poor thereby deteriorating the dispersibility; and thus, a surface resistivity varies easily. Although dispersibility can be improved if surface of the inorganic particle is treated with a silane coupling agent as shown in Patent Document 4, an environmental problem is not solved because a heavy metal is used in the inorganic particle. Furthermore, even in the case that an ionic liquid as shown in Patent Document 5 is added, similarly to Patent Document 3, bleed-out occurs so that it is difficult to solve the foregoing problems.

An object of the present invention is to provide a surface-modified metal oxide powder—having not only a weak charging property but also an excellent stability over time of a triboelectrostatic charge amount, and in addition, capable of being suitably used as an external additive to a toner and the like and of imparting an adequate and stable conductivity when used as a conductivity-imparting agent to be added to a semiconductive material—and a method for producing the same.

Means for Solving the Problems

A first aspect of the present invention relates to a surface-modified metal oxide powder obtained by treating surface of a metal oxide powder, wherein, in the surface-modified metal oxide powder, a ratio (A/B) of an initial triboelectrostatic charge amount (A) at the time of one minute after dispersion of the surface-modified metal oxide powder into a ferrite carrier to a triboelectrostatic charge amount (B) with the lapse of 30 minutes in addition is in the range between 1.0 and 2.0, and the triboelectrostatic charge amount (B) after the lapse of time is in the range between −300 and +300 μC/g.

A second aspect of the present invention relates to a method for producing a surface-modified metal oxide powder by surface treatment of a metal oxide powder, wherein the surface treatment is carried out by using an ionic liquid or by concurrently using the ionic liquid and a surface-modifying agent.

A third aspect of the present invention is the invention based on the first aspect, wherein, furthermore, the surface-modified metal oxide powder contains a nitrogen-containing onium salt on the surface thereof with nitrogen content being in the range between 0.02 and 31 (both inclusive) and an immobilization rate of the onium salt being 10% or more, while a volume resistivity thereof under the pressure of $9.8 \times 10^6$ Pa is in the range between $10^5$ and $10^{11}$ Ωcm.

A fourth aspect of the present invention is the invention based on the first aspect, wherein, furthermore, the surface treatment of the metal oxide powder is carried out by using an ionic liquid.

A fifth aspect of the present invention is the invention based on the fourth aspect, wherein, furthermore, an anion that constitutes the ionic liquid contains a fluorinated alkyl sulfonyl group.

A sixth aspect of the present invention is the invention based on the fourth aspect, wherein, furthermore, amount of the ionic liquid in the surface treatment of the metal oxide powder is in the range between 0.1 and 20 parts by mass relative to 100 parts by mass of the metal oxide powder.

A seventh aspect of the present invention is the invention based on the fourth aspect, wherein, furthermore, the surface treatment of the metal oxide powder is carried out by concurrent use of the ionic liquid and a surface-modifying agent.

An eighth aspect of the present invention is the invention based on the seventh aspect, wherein, furthermore, in the surface treatment of the metal oxide powder, addition amount of the ionic liquid is in the range between 0.1 and 20 parts by mass relative to 100 parts by mass of the metal oxide powder and addition amount of the surface-modifying agent is in the range between 5 and 50 parts by mass relative to 100 parts by mass of the metal oxide powder.

A ninth aspect of the present invention is the invention based on the first aspect or the third to the eighth aspects, wherein, furthermore, the metal oxide powder subjected to the surface treatment is a metal oxide powder of one metal selected from the group consisting of silica, titania, and alumina, or a composite metal oxide powder comprised of two or more metals mentioned hereabove.

A tenth aspect of the present invention is the invention based on the first aspect or the third to the ninth aspects, wherein, furthermore, the metal oxide powder subjected to the surface treatment is a metal oxide powder obtained by a gas-phase method.

An eleventh aspect of the present invention is the invention based on the tenth aspect, wherein, furthermore, a specific surface area of the metal oxide powder obtained by the gas-phase method is in the range between 20 and 380 m²/g.

A twelfth aspect of the present invention is the invention based on the second invention, wherein, furthermore, the surface treatment comprises:

a step of adding 0.1 to 20 parts by mass of the ionic liquid, relative to 100 parts by mass of the metal oxide powder, to the metal oxide powder which has been put in a reaction vessel with stirring the powder under an inert gas atmosphere, and a step of mixing the powder and the ionic liquid in the reaction vessel at temperature of 120 to 300° C.

A thirteenth aspect of the present invention is the invention based on the twelfth aspect, wherein, furthermore, the ionic liquid is diluted with an organic solvent or water and then added to the metal oxide powder.

A fourteenth aspect of the present invention is the invention based on the twelfth aspect or the thirteenth aspect, wherein, furthermore, 5 to 50 parts by mass of the surface-modifying agent relative to 100 parts by mass of the metal oxide powder is added to the ionic liquid, and then this ionic liquid is added to the metal oxide powder.

A fifteenth aspect of the present invention is a semiconductive member containing 0.1 to 50 parts by mass of the surface-modified metal oxide powder according to the first aspect or the third to the eleventh aspects relative to 100 parts by mass of a rubber or a resin and showing a surface resistivity of $10^6$ to $10^{12}$ Ωcm².

Advantages

In the surface-modified metal oxide powder according to the first aspect of the present invention, a ratio (A/B) of an initial triboelectrostatic charge amount (A) at the time of one minute after dispersion of the surface-modified metal oxide powder into a ferrite carrier to a triboelectrostatic charge amount (B) with the lapse of 30 minutes in addition is in the range between 1.0 and 2.0, and the triboelectrostatic charge amount (B) after the lapse of time is in the range between −300 and +300 μC/g. Namely, when this surface-modified metal oxide powder is used as an external additive to a toner used in development of an electrophotographic picture and the like, a developer obtained after mixing thereof with a carrier can not only keep a weak charging property but also have an excellent stability over time of a triboelectrostatic charge amount. Accordingly, even when the powder is added as an external additive to a toner, a developer thereby obtained can have stabilized various properties such as a flowability and a triboelectrostatic charge without significantly deteriorating its characteristics; and in addition, problems such as fogging and image deterioration can be drastically remedied.

In the production method according to the second aspect of the present invention, when surface treatment of a metal oxide powder is carried out by using an ionic liquid or by concurrently using the ionic liquid and a surface-modifier, a surface-modified metal oxide powder having a weaker charging property and a better stability over time of a triboelectrostatic charge amount than a conventional one can be produced. In addition, because the surface treatment is carried out by using an ionic liquid or by concurrently using the ionic liquid and a surface-modifying agent, problems such as coloration and decomposition of the powder can be solved.

The surface-modified metal oxide powder according to the third aspect of the present invention contains a nitrogen-containing onium salt on the surface thereof with nitrogen content being in the range between 0.02 and 3% (both inclusive) and an immobilization rate of the onium salt being 10% or more, while a volume resistivity thereof under the pressure of $9.8 \times 10^6$ Pa is in the range between $10^5$ and $10^{11}$ Ωcm. Because this surface-modified metal oxide powder contains a nitrogen-containing onium salt on the surface thereof, an excellent antistatic property can be obtained when the powder is used as a conductivity-imparting agent that is added to a semiconductive material. In addition, because nitrogen content therein is in the foregoing range, a low volume resistivity such as between $10^6$ and $10^{11}$ Ωcm, which range is useful to realize an antistatic effect, can be obtained.

The surface-modified metal oxide powder according to the tenth aspect of the present invention is characterized in that the metal oxide powder subjected to the surface treatment is a metal oxide powder obtained by a gas-phase method. Although the metal oxide powder obtained by a gas-phase method is extremely low in coagulation degree as compared with the metal oxide powder obtained by a wet method, the former can form a net-work structure easily so that it can be dispersed uniformly onto a toner surface when used as an external additive to a toner. Alternatively, when added into a resin, a net-work structure is formed in a resin while dispersing uniformly thereinto; and thus, a large effect to realize conductivity can be obtained.

BEST MODES FOR CARRYING OUT THE INVENTION

In the following, embodiments to carry out the present invention will be explained.

The surface-modified metal oxide powder of the present invention has a weaker charging property and a further improved stability over time of a triboelectrostatic charge amount as compared with a conventional surface-modified metal oxide powder. Specifically, the surface-modified metal oxide powder is characterized in that a ratio (A/B) of an initial triboelectrostatic charge amount (A) at the time of one minute after dispersion of this metal oxide powder into a ferrite carrier to a triboelectrostatic charge amount (B) with the lapse of 30 minutes in addition is in the range between 1.0 and 2.0, and the triboelectrostatic charge amount (B) after the lapse of time is in the range between −300 and +300 µC/g.

The surface-modified metal oxide powder of the present invention having the foregoing characteristics can be suitably used as an external additive to a toner used in development of an electrophotographic picture. Generally, a toner is obtained, for example, by adding a colorant, an antistatic agent, an external additive, and so on into a binder resin of a thermoplastic resin, in accordance with various toner-producing methods including a polymerization method and a granulation method. In these methods, the metal oxide powder is added as an external additive to improve flowability of a toner or to control charging of a toner. In addition, this metal oxide powder is added to improve transcription property and durability of a toner. In a two-component developer, a carrier such as a ferrite powder and an iron powder is further added to the toner obtained as mentioned above. At this time, for example, if a metal oxide powder having a ratio (A/B) of more than 2.0, wherein (A) is an initial triboelectrostatic charge amount at the time of one minute after dispersion of the metal oxide powder into a ferrite carrier and (B) is a triboelectrostatic charge amount with the lapse of 30 minutes, is used as an external additive to a toner, a charge amount decreases gradually thereby causing problems such as coagulation of a toner and fogging. For this reason, a metal oxide powder added to a toner as an external additive is required to have an excellent stability over time of a triboelectrostatic charge. The surface-modified metal oxide powder of the present invention has the ratio of (A/B) in the range between 1.0 and 2.0, wherein (A) is the initial triboelectrostatic charge amount and (B) is the triboelectrostatic charge amount after elapse of time; in other words, this powder has an excellent stability over time of a triboelectrostatic charge amount upon dispersion into a ferrite carrier. Accordingly, when this powder is used as an external additive, not only coagulation and formation of lumps are difficult to be formed but also flowability can be improved adequately as compared with a conventional one. With this, a chance of fogging, poor cleaning, adhesion of a toner to a photosensitive body, or the like, can be reduced so that an effect to suppress image defection can be realized. When the ratio of the initial triboelectrostatic charge amount (A) to the triboelectrostatic charge amount after lapse of time (B), namely (A/B), is less than 1.0, a triboelectrostatic charge amount increases gradually thereby causing problems such as poor dispersion; when the ratio is more than 2.0, the charge amount decreases gradually thereby causing problems such as fogging and coagulation of a toner. In addition, the triboelectrostatic charge amount after lapse of time (B) is in the range between −300 and +300 µC/g. Among the foregoing, the ratio of the initial triboelectrostatic charge amount (A) to the triboelectrostatic charge amount after lapse of time (B), namely (A/B), is preferably in the range between 1.0 and 1.5, and the triboelectrostatic charge amount after lapse of time (B) is preferably in the range between −200 and +200 µC/g.

In addition, the surface-modified metal oxide powder of the present invention contains on its surface an onium salt having nitrogen. This onium salt is due to an ionic liquid used in surface treatment of a powder, as will be explained later; and presence of this onium salt on powder surface imparts suitable conductivity and an excellent antistatic effect to various semiconductive members containing this powder. Accordingly, the surface-modified metal oxide powder of the present invention can also be suitably used as a conductivity-imparting agent added to impart an antistatic effect to a semiconductive material for producing various semiconductive members including a synthetic resin member, a rubber member, an antistatic film, and a coating material.

An immobilization rate of the onium salt is preferably 10% or more. The immobilization rate of the onium salt means a degree of bonding of the onium salt in the surface-modified metal oxide powder, that is, for example, when the surface-modified metal oxide powder is treated with an extraction solvent under a certain condition, the immobilization rate can be expressed by the rate of the onium salt present on the powder surface after the extraction treatment relative to the onium salt present on the powder surface before the extraction treatment. That is, it means that the higher the immobilization rate is, the stronger a bonding of the onium salt to surface of the metal oxide powder is. In the present description, the immobilization rate of the onium salt is defined as the rate of the nitrogen amount remained on this powder after the extraction treatment by using a Soxhlet extraction equipment (manufactured by BUCHI Labortechnik AG) under a certain condition relative to the nitrogen amount before the extraction treatment.

From a viewpoint of imparting a stable electric resistivity to a semiconductive member, a higher immobilization rate of the onium salt is desirable; but depending on kinds of a resin and a rubber to be added, dispersibility of the powder after its addition, and other conditions such as a mixing method, a sufficient antistatic effect can be imparted even with the immobilization rate of about 10%. In the surface-modified metal oxide powder of the present invention obtained by surface treatment by using an ionic liquid as will be mentioned later, the immobilization rate between 10% or more and less than 50% can be obtained. Because of this, the surface-modified metal oxide powder of the present invention can be suitably used also as a conductivity-imparting agent to be added to a semiconductive material. Below 10%, it is difficult to obtain a stable electric resistivity in various semiconductive material produced by using a semiconductive material added with this powder. With the surface treatment by using an ionic liquid as will be mentioned later, it is difficult to obtain the immobilization rate of 50% or more.

A nitrogen content is preferably in the range between 0.02 and 3.0% (both inclusive). The nitrogen content means the ratio of the nitrogen amount remained on the metal oxide powder relative to the metal oxide powder. When the nitrogen content is less than 0.02%, a sufficient conductivity cannot be obtained; and thus, it is difficult to impart an antistatic effect adequately. On the other hand, when the nitrogen content is beyond the upper limit, coloration of the powder tends to occur from yellow to pale brown whereby a color tone tends to change when added into a resin and so on; and thus, this is not desirable.

The volume resistivity under the pressure of $9.8 \times 10^6$ Pa is preferably in the range between $10^5$ and $10^{11}$ Ωcm. When the volume resistivity under the pressure of $9.8 \times 10^6$ Pa is $10^{11}$ Ωcm or more, it is difficult to impart an adequate antistatic effect. The volume resistivity of the powder can be obtained by measuring the value of resistivity upon applying a pressure to the powder.

The surface-modified metal oxide powder of the present invention having the characteristics mentioned above can be obtained by surface treatment of a metal oxide powder of one metal selected from the group consisting of preferably silica, titania, and alumina, or a composite metal oxide powder comprised of two or more metals mentioned hereabove. As to the silica powder, a so-called fumed silica, obtained by a gas-phase method, namely obtained by a flame hydrolysis of a volatile silicon compound such as a silicon halide, is preferable. As to the titania powder, a powder obtained by decomposition of a volatile titanium compound, after volatized to a gas-phase, in the presence of a flammable or an inflammable gas at high temperature is preferable. As to the alumina powder, a powder obtained by a thermal decomposition method is preferable. On the other hand, as to the composite metal oxide powder, for example, a composite metal oxide powder of silica and titania, obtained by the following method, can be preferably used. Firstly, a silicon tetrachloride gas and a titanium tetrachloride gas, together with an inert gas, are introduced into a mixing chamber of a burner, wherein they are mixed with hydrogen and an air to obtain a gas mixture with a prescribed ratio. Then this gas mixture is burned in a reaction chamber at 1000 to 3000° C. to form a composite metal oxide microparticle of silica and titania. Finally, the microparticle thus obtained is cooled and then collected with a filter to obtain a composite metal oxide powder of silica and titania. These metal oxide powders or composite metal oxide powders may also be used as a powder mixture with 5% by mass of an oxide of alkaline metals such as lithium, sodium, and potassium, or alkaline earth metals such as magnesium and calcium.

An average primary particle diameter of these metal oxide powders to be used is preferably in the range between 5 and 500 nm, and the BET specific surface area thereof is preferably in the range between 20 and 380 m²/g. If the BET specific surface area is below the lower limit, the average particle diameter is too large; and thus, when the powder is used as an external additive to an electrophotographic toner, an effect as a flowability-imparting material is small. When the powder having a too large average particle diameter is used as a conductivity-imparting agent, dispersibility thereof to a resin and a rubber becomes poor so that smoothness of a semiconductive member after production, such as for example, an antistatic film may be damaged. On the other hand, if the specific surface area is above the upper limit, the average particle diameter is too small; and thus, when the powder is used as an external additive to an electrophotographic toner, a burying speed of a toner is so fast that performance deterioration over time may become large. Further, if the specific surface area of the powder to be surface-treated is too large, amount of an ionic liquid to be used in the surface treatment may become unduly large and time for the treatment may be prolonged. In addition, although an exact reason is not clear, there is a tendency that an effect to decrease surface resistivity of a synthetic resin member and the like becomes smaller with increasing the specific surface area of the metal oxide powder; and thus, the metal oxide powder having the specific surface area of more than 380 m²/g is not suitable. It is to be noted in the present description that the primary particle diameter means an average diameter of 100 microparticles arbitrarily selected in a TEM (transmission-type electron microscope) picture and measured. The BET specific surface area means a value obtained by measurement by a BET method.

The surface-modified metal oxide powder of the present invention can be obtained by surface treatment of the foregoing metal oxide powder with an ionic liquid. A heretofore known ionic liquid can be used without particular limitation; and illustrative example of the liquid includes a quaternary salt represented by the following formula (1) (hereinafter, referred to as quaternary salt (1)).

Here, $Q^+$ in the formula (1) represents a quaternary ammonium cation or a quaternary phosphonium cation. $A^-$ represents an anion such as an anion containing a fluorinated alkyl sulfonyl group such as a bis(trifluoromethanesulfonyl)imidate ion $[N(SO_2CF_3)_2^-]$, a tetrafuloroborate ion $[BF_4^-]$, and a hexafluorophosphate ion $[PF_6^-]$.

Illustrative example of the quaternary ammonium cation represented by $Q^+$ includes an aliphatic ammonium cation represented by the following formula (2) (hereinafter, referred to as aliphatic ammonium cation (2)), an alicyclic ammonium cation represented by the following formula (3) (hereinafter, referred to as alicyclic ammonium cation (3)), and a nitrogen-containing heteroaromatic ammonium cation represented by the following formula (4) (hereinafter, referred to as nitrogen-containing heteroaromatic ammonium cation (4)).

[Formula 1]

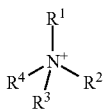
(2)

However, in the formula (2), each $R^1$ to $R^4$ represents an identical or a different optionally-substituted alkyl group.

[Formula 2]

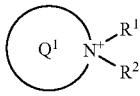
(3)

However, in the formula (3), $Q^1$ represents an optionally-substituted nitrogen-containing alicyclic group. $R^1$ and $R^2$ represent the same meaning as before.

[Formula 3]

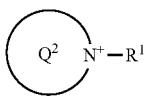
(4)

However, in the formula (4), $Q^2$ represents an optionally-substituted nitrogen-containing heteroaromatic group. $R^1$ represents the same meaning as before.

Example of the optionally-substituted alkyl group includes a linear, a branched, or a cyclic unsubstituted alkyl group such as a methyl group, an ethyl group, a propyl group, an isopropyl group, a butyl group, an isobutyl group, a sec-butyl group, a tert-butyl group, a pentyl group, a neopentyl group, a hexyl group, an isohexyl group, a decyl group, a dodecyl group, an octadecyl group, a cyclopentyl group, and a cyclohexyl group, wherein one or two or more hydrogen atoms that constitute the unsubstituted alkyl group are substituted with an aryl group such as a phenyl group; a disubstituted amino group such as a dimethylamino group; a nitro group; a cyano group; a carboxyl group; an acyl group such as a formyl group and an acetyl group; an alkoxy group such as a methoxy group, an ethoxy group, and a 2-methoxy ethoxy group; an alkenyl group such as a vinyl group; and a group substituted with a substituent including a hydroxy group, a 1-methoxy ethyl group, a 2-(dimethylamino)methyl group, a benzyl group, a 1-phenylethyl group, a 2-phenylethyl group, a 2-methoxyethyl group, a 2-(2-methoxyethoxy)ethyl group, and an allyl group.

Example of the optionally-substituted nitrogen-containing alicyclic group includes a pyrrolidyl group, a 2-methyl pyrrolidyl group, a 3-methyl pyrrolidyl group, a 2-ethyl pyrrolidyl group, a 3-ethyl pyrrolidyl group, a 2,2-dimethyl pyrrolidyl group, a 2,3-dimethyl pyrrolidyl group, a piperidyl group, a 2-methyl piperidyl group, a 3-methyl piperidyl group, a 4-methyl piperidyl group, a 2,6-dimethyl piperidyl group, a 2,2,6,6-tetramethyl piperidyl group, a morpholino group, a 2-methyl morpholino group, and a 3-methyl morpholino group. Example of the optionally-substituted nitrogen-containing heteroaromatic group includes a pyridyl group, a 2-methylpyridyl group, a 3-methylpyridyl group, a 4-methylpyridyl group, a 2,6-dimethylpyridyl group, a 2-methyl-6-ethyl pyridyl group, a 1-methyl imidazolyl group, a 1,2-dimethyl imidazolyl group, a 1-ethyl imidazolyl group, a 1-propyl imidazolyl group, a 1-butyl imidazolyl group, a 1-pentyl imidazolyl group, and a 1-hexyl imidazolyl group.

Example of the aliphatic ammonium cation (2) includes a tetrapentyl ammonium cation, a tetrahexyl ammonium cation, a trimethyl propyl ammonium cation, a tert-butyl triethyl ammonium cation, a benzyl trimethyl ammonium cation, a benzyl triethyl ammonium cation, a trimethyl (2-methoxyethyl) ammonium cation, a dimethylethyl (2-methoxyethyl) ammonium cation, a diethylmethyl (2-methoxyethyl) ammonium cation, a trimethyl [2-(2-methoxyethoxy)ethyl] ammonium cation, a dimethylethyl [2-(2-methoxyethoxy)ethyl] ammonium cation, a diethylmethyl [2-(2-methoxyethoxy)ethyl] ammonium cation, a diallyl methyl hexyl ammonium cation, and diallyl methyl octyl ammonium cation.

Example of the alicyclic ammonium cation (3) includes a 1,1-dimethylpyrrolidinium cation, a 1,1-diethyl pyrrolidinium cation, a 1-ethyl-1-methylpyrrolidinium cation, a 1-propyl-1-methylpyrrolidinium cation, a 1-butyl-1-methylpyrrolidinium cation, a 1-hexyl-1-methyl pyrrolidinium cation, a 1-octyl-1-methylpyrrolidinium cation, a 1-(2-methoxyethyl)-1-methyl pyrrolidinium cation, a 1-[2-(2-methoxyethoxy)ethyl]-1-methylpyrrolidinium cation, a 1,1,2-trimethylpyrrolidinium cation, a 1,1,3-triethyl pyrrolidinium cation, a 1,1-dipropyl pyrrolidinium cation, a 1,1-dibutyl pyrrolidinium cation, a 1,1-dipentyl pyrrolidinium cation, a 1,1-dihexyl pyrrolidinium cation, a 1,1-dimethyl piperidininium cation, a 1,1-dietyl piperidinium cation, a 1-etyl-1-methyl piperidinium cation, a 1-propyl-1-methyl piperidinium cation, a 1-butyl-1-methyl piperidinium cation, a 1-hexyl-1-methyl piperidinium cation, a 1-octyl-1-methyl piperidinium cation, a 1-(2-methoxyethyl)-1-methyl piperidinium cation, a 1-[2-(2-methoxyethoxy)ethyl]-1-methyl piperidinium cation, a 1,1,4-trimethyl piperidinium cation, a 1,1-dimethyl morpholinium cation, a 1,1-diethyl morpholinium cation, a 1-ethyl-1-methyl morpholinium cation, a 1-propyl-1-methyl morpholinium cation, a 1-butyl-1-methyl morpholinium cation, a 1-hexyl-1-methyl morpholinium cation, a 1-octyl-1-methyl morpholinium cation, a 1-(2-methoxyethyl)-1-methyl morpholinium cation, and 1-[2-(2-methoxyethoxy)ethyl]-1-methyl morpholinium cation.

Example of the nitrogen-containing heteroaromatic ammonium cation (4) includes a 1-methylpyridinium cation, a 1-ethyl pyridinium cation, a 1,2-dimethylpyridinium cation, a 1,3-dimethylpyridinium cation, a 1,4-dimethyl pyridinium cation, a 1,2,6-trimethylpyridinium cation, a 1-propyl pyridinium cation, a 1-butyl pyridinium cation, a 1-pentyl pyridinium cation, a 1-hexyl pyridinium cation, a 1,3-dimethyl imidazolium cation, a 1,3-diethyl imidazolium cation, a 1-ethyl-3-methyl imidazolium cation, a 1-butyl-3-methyl imidazolium cation, a 1-hexyl-3-methyl imidazolium cation, a 1-octyl-3-methyl imidazolium cation, a 1,3-dipropyl imidazolium cation, a 1,3-dibutyl imidazolium cation, a 1,3-dipentyl imidazolium cation, and a 1,3-dihexyl imidazolium cation.

Example of the quaternary phosphonium cation represented by $Q^+$ includes aliphatic phosphonium cations represented by the following formula (5).

[Formula 4]

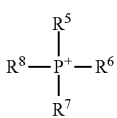
(5)

However, in the formula (5), $R^5$ to $R^8$ each represents an identical or a different hydrocarbon group having 1 to 20 carbon atoms.

Example of the aliphatic phosphonium cation includes cations of a tetramethyl phosphonium, a tetraethyl phosphonium, a tetrapropyl phosphonium, a tetrabutyl phosphonium, a tetrapentyl phosphonium, a tetrahexyl phosphonium, a tetraheptyl phosphonium, a tetraoctyl phosphonium, a tetranonyl phosphonium, a tetradecyl phosphonium, a tetraphenyl phosphonium, a 1,1,1-trimethyl-1-octyl phosphonium, a 1,1,1-trimethyl-1-decyl phosphonium, a 1,1,1-trimethyl-1-dodecyl phosphonium, a 1,1,1-trimethyl-1-pentadecyl phosphonium, a 1,1,1-trimethyl-1-octadecyl phosphonium, a 1,1,1-trimethyl-1-icosyl phosphonium, a 1,1,1-triethyl-1-nonyl phosphonium, a 1,1,1-triethyl-1-undecyl phosphonium, a 1,1,1-triethyl-1-tridecyl phosphonium, a 1,1,1-triethyl-1-hexadecyl phosphonium, a 1,1,1-triethyl-1-heptadecyl phosphonium, a 1,1,1-triethyl-1-nonadceyl phosphonium, a 1,1,1-tripropyl-1-octyl phosphonium, a 1,1,1-tripropyl-1-decyl phosphonium, a 1,1,1-tripropyl-1-dodecyl phosphonium, a 1,1,1-tripropyl-1-pentadecyl phosphonium, a 1,1,1-tripropyl-1-octadecyl phosphonium, a 1,1,1-tripropyl-1-icosyl phosphonium, a 1,1,1-tributyl-1-methyl phosphonium, a 1,1,1-tributyl-1-nonyl phosphonium, a 1,1,1-tributyl-1-undecyl phosphonium, a 1,1,1-tributyl-1-tridecyl phosphonium, a 1,1,1-tributyl-1-tetradecyl phosphonium, a 1,1,1-tributyl-1-hexadecyl phosphonium, a 1,1,1-tributyl-1-heptadecyl phosphonium, a 1,1,1-tributyl-1-nonadecyl phosphonium, a 1,1,1-tripentyl-1-octyl phosphonium, a 1,1,1-tripentyl-1-decyl phosphonium, a 1,1,1-tripentyl-1-dodecyl phosphonium, a 1,1,1-tripentyl-1-tetradecyl phosphonium, a 1,1,1-tripentyl-1-hexadecyl phosphonium, a 1,1,1-tripentyl-1-octadecyl phosphonium, a 1,1,1-tripentyl-1-icosyl phosphonium, a 1,1,1-trihexyl-1-nonyl phosphonium, a 1,1,1-trihexyl-1-undecyl phosphonium, a 1,1,1-trihexyl-1-tridecyl phosphonium, a 1,1,1-trihexyl-1-hexadecyl phosphonium, a 1,1,1-trihexyl-1-octadecyl phosphonium, a 1,1,1-trihexyl-1-icosyl phosphonium, a 1,1,1-triheptyl-1-octyl phosphonium, a 1,1,1-triheptyl-1-decyl phosphonium, a 1,1,1-triheptyl-1-dodecyl phosphonium, a 1,1,1-triheptyl-1-tetradecyl phosphonium, a 1,1,1-triheptyl-1-hexadecyl phosphonium, a 1,1,1-triheptyl-1-octadecyl phosphonium, a 1,1,1-triheptyl-1-icosyl phosphonium, a 1,1,1-trioctyl-1-nonyl phosphonium, a 1,1,1-trioctyl-1-undecyl phosphonium, a 1,1,1-trioctyl-1-tridecyl phosphonium, a 1,1,1-trioctyl-1-pentadecyl phosphonium, a 1,1,1-trioctyl-1-heptadecyl phosphonium, and a 1,1,1-trioctyl-1-nonadecyl phosphonium.

Example of the quaternary salt (1) wherein $Q^+$ is a quaternary ammonium cation includes 1-butyl-1-methyl pyrrolidinium=bis(trifluoromethanesulfonyl) imidate, 1-ethyl-3-methyl imidazolium=bis(trifluoromethanesulfonyl) imidate, 1-butyl pyridinium=bis(trifluoromethanesulfonyl) imidate, 1-hexyl pyridinium=bis(trifluoromethanesulfonyl) imidate, 1-hexyl-4-methylpyridinium=bis(trifluoromethanesulfonyl) imidate, 1,1,1-trioctyl-1-methyl ammonium=bis(trifluoromethanesulfonyl) imidate, 1,1,1-trimethyl-1-hexyl ammonium=bis(trifluoromethanesulfonyl) imidate, 1,1,1-trimethyl-1-(2-methoxyethyl) ammonium=bis(trifluoromethanesulfonyl) imidate, 1,1-dimethyl-1-ethyl-1-(2-methoxyethyl) ammonium=bis(trifluoromethanesulfonyl) imidate, 1,1-diethyl-1-methyl-1-(2-methoxyethyl) ammonium=bis(trifluoromethanesulfonyl) imidate, 1,1,1-trimethyl-1-[2-(2-methoxyethoxy)ethyl] ammonium=bis(trifluoromethanesulfonyl) imidate, 1,1-dimethyl-1-ethyl-1-[2-(2-methoxyethoxy)ethyl] ammonium=bis(trifluoromethanesulfonyl) imidate, 1,1-diethyl-1-methyl-[2-(2-methoxyethoxy)ethyl] ammonium=bis(trifluoromethanesulfonyl) imidate, 1,1-diallyl-1-methyl-1-hexyl ammonium=bis(trifluoromethanesulfonyl) imidate, 1,1-diallyl-1-methyl-1-octyl ammonium=bis(trifluoromethanesulfonyl) imidate, 1,1,1-trioctyl-1-methyl ammonium=tetrafluoroborate, 1,1,1-trimethyl-1-(2-methoxyethyl) ammonium=tetrafluoroborate, 1,1-dimethyl-1-ethyl-1-(2-methoxyethyl) ammonium=tetrafluoroborate, 1,1-diethyl-1-methyl-1-(2-methoxyethyl) ammonium=tetrafluoroborate, 1,1,1-trimethyl-1-[2-(2-methoxyethoxy)ethyl] ammonium=tetrafluoroborate, 1,1-dimethyl-1-ethyl-1-[2-(2-methoxyethoxy)ethyl] ammonium=tetrafluoroborate, 1,1-diethyl-1-methyl-1-[2-(2-methoxyethoxy)ethyl] ammonium=tetrafluoroborate, 1,1-diallyl-1-methyl-1-hexyl ammonium=tetrafluoroborate, 1,1-diallyl-1-methyl-1-octyl ammoum=tetrafluoroborate, 1-butyl-1-methyl pyrrolidinium=tetrafluoroborate, 1-ethyl-3-methyl imidazolium=tetrafluoroborate, 1-butyl pyridinium=tetrafluoroborate, 1-hexyl pyridinium=tetrafluoroborate, 1-hexyl-4-methyl pyridinium=tetrafluoroborate, 1,1-dimethyl-1-ethyl-1-[2-(2-methoxyethoxy)ethyl] ammonium=hexafluorophosphate, 1-butyl-1-methyl pyrrolidinium=hexafluorophosphate, 1-ethyl-3-methyl imidazolium=hexafluorophosphate, 1-butyl pyridinium=hexafluorophosphate, 1-hexyl pyridinium=hexafluorophosphate, 1-hexyl-4-methyl pyridinium=hexafluorophosphate, and 1,1,1-trioctyl-1-methyl ammonium=hexafluorophosphate.

Example of the quaternary salt (1) wherein $Q^+$ is a quaternary phosphonium cation includes tetramethyl phosphonium=bis(trifluoromethanesulfonyl) imidate, tetraethyl phosphonium=bis(trifluoromethanesulfonyl) imidate, tetrabutyl phosphonium=bis(trifluoromethanesulfonyl) imidate, tetrabutyl phosphonium=bis(pentafluoroethanesulfonyl) imidate, tetraphenyl phosphonium=bis(trifluoromethanesulfonyl) imidate, 1,1,1-triphenyl-1-ethyl phosphonium=bis(trifluoromethanesulfonyl) imidate, 1,1,1-triphenyl-1-butyl phosphonium=bis(trifluoromethanesulfonyl) imidate, 1,1,1-trimethyl-1-nonyl phosphonium=bis(trifluoromethanesulfonyl) imidate, 1,1,1-trimethyl-1-tridecyl phosphonium=bis(trifluoromethanesulfonyl) imidate, 1,1,1-trimethyl-1-hexadecyl phosphonium=bis(trifluoromethanesulfonyl) imidate, 1,1,1-trimethyl-1-heptadecyl phosphonium=bis(trifluoromethanesulfonyl) imidate, 1,1,1-trimethyl-1-nonadecyl phosphonium=bis(trifluoromethanesulfonyl) imidate, 1,1,1-triethyl-1-octyl phosphonium=bis(trifluoromethanesulfonyl) imidate, 1,1,1-triethyl-1-decyl phosphonium=bis(trifluoromethanesulfonyl) imidate, 1,1,1-triethyl-1-dodecyl phosphonium=bis(trifluoromethanesulfonyl) imidate, 1,1,1-triethyl-1-pentadecyl phosphonium=bis(trifluoromethanesulfonyl) imidate, 1,1,1-triethyl-1-octadecyl phosphonium=bis(trifluoromethanesulfonyl) imidate, 1,1,1-triethyl-1-icosyl phosphonium=bis(trifluoromethanesulfonyl) imidate, 1,1,1-tripropyl-1-octyl phosphonium=bis(trifluoromethanesulfonyl) imidate, 1,1,1-tripropyl-1-decyl phosphonium=bis(trifluoromethanesulfonyl) imidate, 1,1,1-tripropyl-1-tridecyl phosphonium=bis(trifluoromethanesulfonyl) imidate, 1,1,1-tripropyl-1-pentadecyl phosphonium=bis(trifluoromethanesulfonyl) imidate, 1,1,1-tripropyl-1-octadecyl phosphonium=bis(trifluoromethanesulfonyl) imidate, 1,1,1-tripropyl-1-icosyl phosphonium=bis(trifluoromethanesulfonyl) imidate, 1,1,1-tributyl-1-octyl phosphonium=bis(trifluoromethanesulfonyl) imidate, 1,1,1-tributyl-1-nonyl phosphonium=bis(pentafluoroethanesulfonyl) imidate, 1,1,1-tributyl-1-decyl phosphonium=bis(heptafluoropropanesulfonyl) imidate, 1,1,1-tributyl-1-undecyl phosphonium=bis(nonafluorobutanesulfonyl) imidate, 1,1,1-tributyl-1-dodecyl phosphonium=

(trifluoromethanesulfonyl) (pentafluoroethanesulfonyl) imidate, 1,1,1-tributyl-1-tridecyl phosphonium=(trifluoromethanesulfonyl) (heptafluoropropanesulfonyl) imidate, and 1,1,1-tributyl-1-icosyl phosphonium=(trifluoromethanesulfonyl) (nonafluorobutanesulfonyl) imidate.

The foregoing ionic liquid, solely comprised of $Q^+$ (cation) and $A^-$ (anion) in the above formula (1), is a molten salt that is in a liquid state at a normal temperature; but in view of uniform surface treatment, it is preferable that the ionic liquid be used for the surface treatment by diluting in an organic solvent such as hexane, toluene, an alcohol (an aliphatic alcohol having 1 to 8 carbon atoms, such as methanol, ethanol, and propanol) and an acetone, or in water as appropriate, followed by adjusting the concentration thereof to a prescribed value in an organic solvent or in water.

Alternatively, the surface treatment may be done by concurrent use of the foregoing ionic liquid and a surface-modifying agent. Example of the surface-modifying agent that can be concurrently used with the ionic liquid includes an alkyl silazane compound such as hexamethyl silazane; an alkyl alkoxy silane compound such as dimethyl dimethoxy silane, dimethyl diethoxy silane, trimethyl methoxy silane, methyl trimethoxy silane, and butyl trimethoxy silane; a chlorosilane compound such as dimethyl dichlorosilane and trimethyl chlorosilane; and a silicone oil compound. These may be used singly or as a mixture of two or more of them depending on the purpose. Example of the silicone oil compound includes a straight silicone oil such as dimethyl silicone oil, methyl phenyl silicone oil, a methyl hydrogen silicone oil; and a modified silicone oil such as an amino-modified silicone oil, an epoxy-modified silicone oil, a carboxyl-modified silicone oil, a carbinol-modified silicone oil, a methacryl-modified silicone oil, a mercapto-modified silicone oil, a phenol-modified silicone oil, a one-terminal reactive, modified silicone oil, a both-terminal reactive, modified silicone oil, a modified silicone oil having different functional groups, a polyether-modified silicone oil, a methylstyryl-modified silicone oil, an alkyl-modified silicone oil, a silicone oil modified with a higher fatty acid ester, a specially modified hydrophilic silicone oil, a higher-alkoxy-modified silicon oil, a modified silicone oil having a higher fatty acid, and a fluorine-modified silicone oil. These may be used singly or as a mixture of two or more of them. When surface treatment by the ionic liquid is carried out by concurrently using the foregoing surface-modifying agent, not only a hydrophobizing effect but also an effect of further improved flowability can be realized.

A specific method for producing the surface-modified metal oxide powder of the present invention by surface treatment by using the ionic liquid or by concurrently using the ionic liquid and the surface-modifying agent is as following. Firstly, an ionic liquid with amount of preferably 0.1 to 20 parts by mass relative to 100 parts by mass of a metal oxide powder to be used as a raw material is arranged. If amount of the ionic liquid to be used is below the lower limit, an intended weak charging property cannot be imparted to the metal oxide powder, while above the upper limit, flowability is deteriorated; and thus both are not desirable. The ionic liquid may be used as it is without being diluted; but it is preferable if the ionic liquid is used after being diluted with an organic solvent or water, because surface-modification of the metal oxide powder can be done more uniformly. Addition amount of the organic solvent or water for this treatment is preferably 100 to 1000 parts by mass, or more preferably 100 to 500 parts by mass, relative to 100 parts by mass of the ionic liquid to be used. If added amount of the organic solvent or water is less than 100 parts by mass relative to 100 parts by mass of the ionic liquid, the foregoing effect due to the dilution cannot be obtained easily, while more than 1000 parts by mass, flowability tends to be deteriorated; and thus both are not desirable.

When surface treatment is carried out by concurrent use of a surface-modifying agent, 5 to 50 parts by mass of the surface-modifying agent, relative to 100 parts by mass of the metal oxide powder, is furthermore added to the ionic liquid that has been diluted or not diluted. If addition amount of the surface-modifying agent is below the lower limit, surface modification of the metal oxide powder tends to be non-uniform. While above the upper limit, coagulation of the metal oxide powder occurs; and thus it is not desirable. In this ionic liquid, a catalyst and the like may be added additionally to facilitate the reaction.

Then, the metal oxide powder is taken into a reactor; and then, the ionic liquid or the ionic liquid added with the surface-modifying agent is added to the powder with stirring the powder by an agitation blade and the like under an atmosphere of an inert gas such as a nitrogen gas. An atmosphere of an inert gas such as a nitrogen gas is used to suppress the oxidation. Then, the resulting mixture is mixed at 120 to 300° C. for 30 to 120 minutes in the reactor. The reason why the temperature is made between 120 and 300° C. is as following; if the temperature is below the lower limit, an intended triboelectrostatic charge amount after lapse of time cannot be obtained easily because surface modification of the metal oxide powder is insufficient, while above the upper limit, there may be a chance that the surface-modifying agent is deteriorated; and thus, both are not desirable. Within the foregoing range, the temperature is particularly preferable in the range between 150 and 300° C. Likewise, if the time of mixing is shorter than the lower limit, effects of the surface modification such as hydrophobicity and flowability cannot be imparted fully to the metal oxide powder because surface modification of the metal oxide powder is insufficient, while if the time is longer than the upper limit, there may be a chance that the surface-modifying agent is deteriorated; and thus, both are not desirable. Within the foregoing range, the time of mixing is particularly preferable in the range between 30 and 90 minutes. Thereafter, the powder is cooled by cooling water or by allowing to stand at room temperature to obtain the surface-modified metal oxide powder.

According to the process steps mentioned above, the surface-modified metal oxide powder of the present invention can be obtained. The surface treatment method used in this production method is useful in coating of surface of a metal oxide powder with an ionic liquid. The foregoing surface treatment is indispensable to provide a metal oxide powder with such properties as stability over time of a triboelectrostatic charge amount useful as an external additive of a toner and volume resistivity suitable as a conductivity-imparting agent added in a semiconductive material. For example, if a metal oxide powder is used as an external additive as it is without the surface treatment as mentioned above, such effects as to stabilize various properties including flowability and triboelectrostatic charge of a toner cannot be obtained. Or alternatively, even if an ionic liquid and a metal oxide powder without the foregoing surface treatment are separately added into a resin, a rubber, and the like, an adequate antistatic effect cannot be imparted thereto. The reason for this may be assumed that, because an ionic liquid is coated uniformly on surface of a metal oxide powder by the foregoing surface treatment, the surface-modified metal oxide powder of the present invention is provided with such properties as stability over time of a triboelectrostatic charge amount useful as an external additive of a toner and volume resistivity suitable as a conductivity-imparting agent.

The semiconductive member of the present invention is formed with a semiconductive material obtained by blending 1 to 80 parts by mass of the surface-treated metal oxide powder according to the method mentioned above relative to 100 parts by mass of a rubber or a resin. That is, the semiconductive member of the present invention contains 1 to 80 parts by mass of the surface-modified metal oxide powder of the present invention relative to 100 parts by mass of a resin or a rubber. This semiconductive member contains, as a conductivity-imparting agent, the surface-modified metal oxide powder of the present invention subjected to the foregoing surface treatment, thereby having a surface resistivity of $10^6$ to $10^{12}$ $\Omega/cm^2$, the range suitable as a semiconductive member, such as, for example, a charging roller, a transfer roller, and a developing roller in an image forming equipment.

EXAMPLES

Hereinafter, Examples of the present invention, together with Comparative Examples thereof, will be explained in detail.

Example 1

Firstly, an ionic liquid was prepared by diluting 5 g of an ionic liquid of an aliphatic amine type (IL-A2, manufactured by Koei Chemical Co., Ltd.) into 15 g of ethanol as the organic solvent. Then, 100 g of a silica powder having the BET specific surface area of 200 $m^2/g$ obtained by a gas-phase method (trade name: AEROSIL® 200, manufactured by Nippon Aerosil Co., Ltd.) was taken into a reactor, to which was then added the foregoing diluted ionic liquid with stirring the powders by rotating blades under a nitrogen atmosphere. Subsequently, the resulting mixture was stirred at 200° C. for 60 minutes under a nitrogen atmosphere, and then, cooled by cooling water to obtain a metal oxide powder. This surface-modified metal oxide powder obtained by the surface treatment mentioned above was assigned as Example 1. Meanwhile, the ionic liquid used mentioned above is the one that contains a fluorinated alkyl sulfonyl group as the anionic group.

Example 2

A metal oxide powder was obtained in a manner similar to the surface treatment of Example 1 except that 20 g of dimethyl silicone oil was further added as the surface-modifying agent to the diluted ionic liquid. This surface-modified metal oxide powder was assigned as Example 2.

Example 3

A metal oxide powder was obtained in a manner similar to the surface treatment of Example 1 except that 20 g of hexamethyl disilazane was further added as the surface-modifying agent to the diluted ionic liquid. This surface-modified metal oxide powder was assigned as Example 3.

Example 4

A metal oxide powder was obtained in a manner similar to the surface treatment of Example 1 except that 20 g of octyl trimethoxy silane as the surface-modifying agent and 0.5 g of diethyl amine were further added to the diluted ionic liquid. This surface-modified metal oxide powder was assigned as Example 4.

Example 5

A metal oxide powder was obtained in a manner similar to the surface treatment of Example 1 except that a silica powder having the BET specific surface area of 300 $m^2/g$ obtained by a gas-phase method (trade name: AEROSIL® 300, manufactured by Nippon Aerosil Co., Ltd.) was used and 30 g of dimethyl silicone oil was further added as the surface-modifying agent to the diluted ionic liquid. This surface-modified metal oxide powder was assigned as Example 5.

Example 6

A metal oxide powder was obtained in a manner similar to the surface treatment of Example 1 except that a silica powder having the BET specific surface area of 50 $m^2/g$ obtained by a gas-phase method (trade name: AEROSIL® 50, manufactured by Nippon Aerosil Co., Ltd.) was used and 15 g of dimethyl silicone oil was further added as the surface-modifying agent to the diluted ionic liquid. This surface-modified metal oxide powder was assigned as Example 6.

Example 7

A metal oxide powder was obtained in a manner similar to the surface treatment of Example 1 except that a composite metal oxide powder of silica and titania having the BET specific surface area of 300 $m^2/g$ obtained by a gas-phase method was used and 25 g of octyl trimethoxy silane as the surface-modifying agent and 1 g of diethyl amine were further added to the diluted ionic liquid. This surface-modified metal oxide powder was assigned as Example 7.

Comparative Example 1

A silica powder not subjected to the surface treatment and having the BET specific surface area of 200 $m^2/g$ obtained by a gas-phase method (trade name: AEROSIL® 200, manufactured by Nippon Aerosil Co., Ltd.) was assigned as Comparative Example 1.

Comparative Example 2

A metal oxide powder was obtained in a manner similar to the surface treatment of Example 1 except that the treatment was carried out without using the ionic liquid but by using only a surface-modifying agent obtained by diluting 20 g of dimethyl silicone oil into 60 g of hexane as the organic solvent. This surface-modified metal oxide powder was assigned as Comparative Example 2.

Comparative Example 3

A metal oxide powder was obtained in a manner similar to the surface treatment of Example 1 except that the treatment was carried out without using the ionic liquid but by using only a surface-modifying agent of 20 g of hexamethyl disilazane. This surface-modified metal oxide powder was assigned as Comparative Example 3.

Comparative Example 4

A metal oxide powder was obtained in a manner similar to the surface treatment of Example 1 except that the treatment was carried out without using the ionic liquid but by using only a surface-modifying agent obtained by mixing 20 g of octyl trimethoxy silane with 0.5 g of diethyl amine. This surface-modified metal oxide powder was assigned as Comparative Example 4.

Comparative Example 5

A metal oxide powder was obtained in a manner similar to the surface treatment of Example 1 except that a silica powder having the BET specific surface area of 300 m²/g obtained by a gas-phase method (trade name: AEROSIL® 300, manufactured by Nippon Aerosil Co., Ltd.) was used and the treatment was carried out without using the ionic liquid but by using only a surface-modifying agent obtained by adding 60 g of hexane as the organic solvent to be used into 30 g of dimethyl silicone oil. This surface-modified metal oxide powder was assigned as Comparative Example 5.

Comparative Example 6

A metal oxide powder was obtained in a manner similar to the surface treatment of Example 1 except that a silica powder having the BET specific surface area of 50 m²/g obtained by a gas-phase method (trade name: AEROSIL® 50, manufactured by Nippon Aerosil Co., Ltd.) was used and the treatment was carried out without using the ionic liquid but by using only a surface-modifying agent obtained by diluting 45 g of hexane as the organic solvent to be used into 15 g of dimethyl silicone oil. This surface-modified metal oxide powder was assigned as Comparative Example 6.

Comparative Example 7

A metal oxide powder was obtained in a manner similar to the surface treatment of Example 1 except that a composite metal oxide powder of silica and titania having the BET specific surface area of 300 m²/g obtained by a gas-phase method was used and the treatment was carried out without using the ionic liquid but by using only a surface-modifying agent obtained by mixing 25 g of octyl trimethoxy silane with 1 g of diethyl amine. This surface-modified metal oxide powder was assigned as Comparative Example 7.

Comparative Example 8

Firstly, 1 g of γ-aminopropyl triethoxy silane (trade name: KBE 903, manufactured by Shin-Etsu Chemical Co., Ltd.), 1.5 g of N-(β-aminoethyl)-γ-aminopropyl trimethoxy silane (trade name: KBM 603, manufactured by Shin-Etsu Chemical Co., Ltd.), and 5 g of dimethyl silicone oil (trade name: KF 96, manufactured by Shin-Etsu Chemical Co., Ltd.) were mixed to obtain a mixture solution. Then, a silica powder having the BET specific surface area of 200 m²/g obtained by a gas-phase method (trade name: AEROSIL® 200, manufactured by Nippon Aerosil Co., Ltd.) was taken into a reactor, to which was then added the foregoing mixture solution by spraying while stirring the powders under a nitrogen atmosphere. Subsequently, the resulting mixture was mixed while being stirred at 200° C. for 60 minutes, and then cooled to obtain a metal oxide powder. This surface-modified metal oxide powder obtained by the surface treatment mentioned above was assigned as Comparative Example 8. Meanwhile, the amine-containing silane coupling agent A and the amine-containing silane coupling agent B in Table 2 are the foregoing γ-aminopropyl triethoxy silane and N-(β-aminoethyl)-γ-aminopropyl trimethoxy silane, respectively.

TABLE 1

| | Metal oxide | | Surface treatment | | | |
|---|---|---|---|---|---|---|
| | | BET specific surface area [m²/g] | Ionic liquid | | Surface-modifying agent | |
| | Kind | | Kind | Added amount [g] | Kind | Added amount [g] |
| Example 1 | Silica | 200 | Aliphatic amine | 5 | — | — |
| Example 2 | Silica | 200 | Aliphatic amine | 5 | Dimethyl silicone oil | 20 |
| Example 3 | Silica | 200 | Aliphatic amine | 5 | Hexamethyl disilazane | 20 |
| Example 4 | Silica | 300 | Aliphatic amine | 5 | Octyl trimethoxy silane/ diethyl amine | 20/0.5 |
| Example 5 | Silica | 300 | Aliphatic amine | 5 | Dimethyl silicone oil | 30 |
| Example 6 | Silica | 50 | Aliphatic amine | 5 | Dimethyl silicone oil | 15 |
| Example 7 | Silica/ titania | 300 | Aliphatic amine | 5 | Octyl trimethoxy silane/ diethyl amine | 25/1 |

TABLE 2

| | Metal oxide | | Surface treatment | | | |
|---|---|---|---|---|---|---|
| | | BET specific surface area [m²/g] | Other than ionic liquid | | Surface-modifying agent | |
| | Kind | | Kind | Added amount [g] | Kind | Added amount [g] |
| Comparative Example 1 | Silica | 200 | — | — | — | — |
| Comparative Example 2 | Silica | 200 | — | — | Dimethyl silicone oil | 20 |
| Comparative Example 3 | Silica | 200 | — | — | Hexamethyl disilazane | 20 |
| Comparative Example 4 | Silica | 200 | — | — | Octyl trimethoxy silane/diethyl amine | 20/0.5 |
| Comparative Example 5 | Silica | 300 | — | — | Dimethyl silicone oil | 30 |
| Comparative Example 6 | Silica | 50 | — | — | Dimethyl silicone oil | 15 |
| Comparative Example 7 | Silica/ titania | 300 | — | — | Octyl trimethoxy silane/diethyl amine | 25/1 |
| Comparative Example 8 | Silica | 50 | Amine-containing silane coupling agent A | 1 | Dimethyl silicone oil | 5 |
| | | | Amine-containing silane coupling agent B | 1.5 | | |

Comparative Tests and Evaluation 1

Initial triboelectrostatic charge amount (A) and triboelectrostatic charge amount after lapse of time (B) were measured on each metal oxide powder obtained by Examples 1 to 7 and Comparative Examples 1 to 8; and the results thereof are shown in the following Table 3.

Specifically, at first, 50 g of a ferrite carrier and 0.1 g of the obtained metal oxide powder were taken into a glass vessel (75 mL), which was then capped. After the vessel was shaken in a TURBLER mixer for one minute, 0.1 g of the ferrite carrier mixed with the metal oxide powder was taken as a sample. The charge amount measured with a blow-off charge measurement apparatus (TB-200 type, manufactured by Toshiba Chemical Corporation) after blow-off of the sample with a nitrogen gas for one minute was taken as the initial triboelectrostatic charge amount (A). After the vessel was shaken in a tumbler mixer for 30 minutes, the charge amount measured in a similar manner to the above was taken as the triboelectrostatic charge amount after lapse of time (B).

TABLE 3

| | Initial triboelectrostatic charge amount (A) [μC/g] | Triboelectrostatic charge amount after lapse of time (B) [μC/g] | Stability over time (A/B) |
|---|---|---|---|
| Example 1 | −130 | −129 | 1.0 |
| Example 2 | −59 | −55 | 1.1 |
| Example 3 | −55 | −50 | 1.1 |
| Example 4 | −95 | −85 | 1.1 |
| Example 5 | −75 | −65 | 1.2 |
| Example 6 | −63 | −58 | 1.1 |
| Example 7 | −111 | −114 | 1.0 |
| Comparative Example 1 | −513 | −111 | 4.6 |
| Comparative Example 2 | −836 | −588 | 1.4 |
| Comparative Example 3 | −823 | −380 | 2.2 |
| Comparative Example 4 | −536 | −205 | 2.6 |
| Comparative Example 5 | −879 | −496 | 1.8 |
| Comparative Example 6 | −309 | −107 | 2.9 |
| Comparative Example 7 | −549 | −255 | 2.2 |
| Comparative Example 8 | 530 | 130 | 4.1 |

As can be seen in Table 3, each of the metal oxide powder of Examples 1 to 7 has a smaller initial triboelectrostatic charge amount (A) as compared with any of the metal powders of Comparative Examples 1 to 8. The triboelectrostatic charge amount after lapse of time (B) is somewhat larger in Examples 1 and 7 than in Comparative Examples 1 and 6; but the stability over time is 2.0 or less in any of Examples, thereby confirming an excellent stability over time of a triboelectrostatic charge amount.

Example 8

Firstly, a metal oxide powder was obtained in a manner similar to the surface treatment of Example 1 except that a silica powder with the BET specific surface area of 50 m²/g obtained by a gas-phase method (trade name: AEROSIL® 50, manufactured by Nippon Aerosil Co., Ltd.) and 10 g of a pyridinium-type ionic liquid (IL-P14, manufactured by Koei Chemical Co., Ltd.) diluted into 40 g of ethanol were used, and that the treatment conditions with temperature of 120° C. and time of 45 minutes were employed. Meanwhile, the ionic liquid mentioned above is the one that contains a fluorinated alkyl sulfonyl group as the anionic group.

Then, 10 g of the foregoing powder was added as the conductivity-imparting agent to 50 g of EPDM (3045: ethylene propylene diene rubber, manufactured by Mitsui Chemicals, Inc.), and then the resulting mixture was fully mixed by using a two-axis roller to obtain a semiconductive material in a paste form. Subsequently, an EPDM rubber sheet was prepared by using this semiconductive material in a paste form.

The metal oxide powder obtained by the foregoing surface treatment and the EPDM rubber sheet containing this powder as the conductivity-imparting agent were assigned as Example 8.

Example 9

A metal oxide powder was obtained in a manner similar to the surface treatment of Example 8 except that a silica powder with the BET specific surface area of 130 m²/g obtained by a gas-phase method (trade name: AEROSIL® 130, manufactured by Nippon Aerosil Co., Ltd.) and a diluted aliphatic phosphonium-type ionic liquid (IL-AP3, manufactured by Koei Chemical Co., Ltd.) as the ionic liquid were used. Further, an EPDM rubber sheet was prepared in a manner similar to that of Example 8 except that this powder was used as the conductivity-imparting agent. Meanwhile, the ionic liquid used mentioned above is the one that contains a fluorinated alkyl sulfonyl group as the anionic group.

The metal oxide powder obtained by the foregoing surface treatment and the EPDM rubber sheet containing this powder as the conductivity-imparting agent were assigned as Example 9.

Comparative Example 9

An EPDM rubber sheet was prepared in a manner similar to that of Example 8 except that a silica powder not subjected to the surface treatment and having the BET specific surface area of 50 m²/g obtained by a gas-phase method (trade name: AEROSIL® 50, manufactured by Nippon Aerosil Co., Ltd.) was used as the conductivity-imparting agent.

The foregoing metal oxide powder without the surface treatment and the EPDM rubber sheet containing this powder as the conductivity-imparting agent were assigned as Comparative Example 9.

Comparative Example 10

A metal oxide powder was obtained in a manner similar to the surface treatment of Example 9 except that a solution of 5 g of γ-aminopropyl triethoxy silane (trade name: KBE 903, manufactured by Shin-Etsu Chemical Co., Ltd.) diluted to 20 g of ethanol (this diluted solution is not the ionic liquid) was used. Further, an EPDM rubber sheet was prepared in a manner similar to that of Example 9 except that this powder was used as the conductivity-imparting agent.

The metal oxide powder obtained by the foregoing surface treatment and the EPDM rubber sheet containing this powder as the conductivity-imparting agent were assigned as Comparative Example 10.

Comparative Example 11

A metal oxide powder was obtained in a manner similar to the surface treatment of Example 9 except that 5 g of ethanol diluted into 0.08 g of an aliphatic phosphonium-type ionic liquid (IL-AP3, manufactured by Koei Chemical Co., Ltd.) was used as the ionic liquid. Further, an EPDM rubber sheet was prepared in a manner similar to that of Example 9 except that this powder was used as the conductivity-imparting agent.

The metal oxide powder obtained by the foregoing surface treatment and the EPDM rubber sheet containing this powder as the conductivity-imparting agent were assigned as Comparative Example 11.

Comparative Tests and Evaluation 2

Nitrogen content, immobilization rate obtained from the nitrogen content, and volume resistivity were measured on each metal oxide powder obtained by Examples 8 and 9 and Comparative Examples 9 to 11. Further, surface resistivity of each of the EPDM rubber sheets prepared in Examples 8 and 9 and Comparative Examples 9 to 11 was measured. These results are shown in the following Table 4. Meanwhile, in a similar manner to that of Comparative Tests and Evaluation 1, initial triboelectrostatic charge amount (A) and triboelectrostatic charge amount after lapse of time (B) were measured on each of the metal oxide powders obtained by Examples 8 and 9 and Comparative Examples 9 to 11; the results thereof, together with values of (A/B), are shown in Table 4.

(1) Nitrogen Content:

Nitrogen content was measured on a test sample of prescribed amount of a metal oxide powder by using SUMI-GRAPH NC-22, wherein boats containing the standard sample and the test sample which had been weighed arranged in SUMIGRAPH were set in the instrument for measurement. According to a data processing program, automatic calculation was made to the final result. The calculated value is expressed as the nitrogen content in the prescribed amount of a metal oxide powder.

(2) Immobilization Rate of an Onium Salt:

Firstly, a sample of 0.7 g of a metal oxide powder was subjected to the extraction with a Soxhlet extraction equipment (manufactured by BUCHI Labortechnik AG) by using ethanol as the extraction solvent with extraction time of 60 minutes and rinsing time of 30 minutes to extract a free oil on the powder. After the extraction, the nitrogen content in the powder was measured by the foregoing method; then percentage thereof was calculated by dividing it with the nitrogen content in the powder before the extraction. This calculated value was taken as the immobilization rate of an onium salt.

(3) Volume Resistivity:

This was measured by using a high resistivity meter (Hiresta-UP, manufactured by Mitsubishi Chemical Corporation). A sample of a prescribed amount of a metal oxide powder was charged from an upper part of the cylinder arranged in the high resistivity meter; and then a probe unit was attached thereto. After pressure and voltage were set at the respective prescribed values, the measurement was started; after a prescribed lapse of time, resistivity appeared after completion of the measurement was read. A value appeared in a digital scale was read as thickness of the sample, and specific resistivity was calculated according to the following equation (6).

$$\rho v = 49.08 \times \rho / t \quad (6)$$

In the above equation (6), $\rho v$ is volume specific resistivity ($\Omega$cm), $\rho$ is the foregoing read resistivity ($\Omega$), and reference character t is thickness (mm) of the sample.

(4) Surface Resistivity:

Surface resistivity of each of the EPDM rubber sheets was measured by a four-terminal method probe using a high resistivity meter (Hiresta-UP, manufactured by Mitsubishi Chemical Corporation).

TABLE 4

| | Metal oxide powder | | | | | | |
| --- | --- | --- | --- | --- | --- | --- | --- |
| | Nitrogen content (%) | Nitrogen immobilization rate (%) | Volume resistivity ($\Omega$ cm) | Initial triboelectrostatic charge amount (A) [$\mu$C/g] | Triboelectrostatic charge amount after lapse of time (B) [$\mu$C/g] | Stability over time (A/B) | EPDM rubber sheet Surface resistivity ($\Omega$/cm$^2$) |
| Example 8 | 0.60 | 25 | $2 \times 10^5$ | −40 | −35 | 1.1 | $1 \times 10^9$ |
| Example 9 | 0.15 | 20 | $5 \times 10^7$ | −70 | −62 | 1.1 | $8 \times 10^{11}$ |
| Comparative Example 9 | Below detection limit | — | $>1 \times 10^{14}$ | −411 | −170 | 2.4 | $>1 \times 10^{14}$ |
| Comparativve Example 10 | 0.48 | 80 | $>1 \times 10^{13}$ | 400 | 60 | 6.6 | $>1 \times 10^{14}$ |
| Comparative Example 11 | Below detection limit | — | $>1 \times 10^{14}$ | −387 | −161 | 2.4 | $>1 \times 10^{14}$ |

As can be seen in Table 4, each of metal oxide powders of Examples 8 and 9 has a lower volume resistivity as compared with Comparative Examples 9 to 11, indicating that the former group has volume resistivity in the range between $10^5$ and $10^{11}$ $\Omega$cm, the range suitable as the conductivity-imparting agent. In addition, EPDM rubber sheets of Examples 8 and 9, containing these powders as the conductivity-imparting agent, have surface resistivity in the range between $10^6$ and $10^{12}$ $\Omega$/cm$^2$, the range useful as a semiconductive member, thereby confirming that these sheets have an excellent antistatic property.

INDUSTRIAL APPLICABILITY

The present invention can be used as an external additive added into a powder paint, an electrophotographic toner, and so on, or as a conductivity-imparting material to impart conductivity to various semiconductive members including a synthetic resin member, a rubber member, an antistatic film, and a coating material, thereby imparting an antistatic effect thereto.

The invention claimed is:

1. A surface-modified metal oxide powder obtained by treating a surface of a metal oxide powder with an ionic liquid, wherein a ratio (A/B) of an initial triboelectrostatic charge amount (A) at a time one minute after dispersion of the surface-modified metal oxide powder into a ferrite carrier to a triboelectrostatic charge amount (B) after a lapse of 30 additional minutes is in a range from 1.0 to 2.0, and the triboelectrostatic charge amount (B) is in a range from −300 and to +300 µC/g;

wherein the metal oxide powder subjected to the surface treatment is fumed silica.

2. The surface-modified metal oxide powder according to claim 1, wherein the surface-modified metal oxide powder contains a nitrogen-containing onium salt on the surface thereof with nitrogen content being in the range between 0.02 and 3% and an immobilization rate of the onium salt being 10% or more, while a volume resistivity thereof under the pressure of $9.8 \times 10^6$ Pa is in the range between $10^5$ and $10^{11}$ Ωcm.

3. A semiconductive member containing 0.1 to 50 parts by mass of the surface-modified metal oxide powder according to claim 2 relative to 100 parts by mass of a rubber or a resin and showing a surface resistivity of $10^6$ to $10^{12}$ Ω/cm².

4. The surface-modified metal oxide powder according to claim 1, wherein an anion that constitutes the ionic liquid contains a fluorinated alkyl sulfonyl group.

5. A semiconductive member containing 0.1 to 50 parts by mass of the surface-modified metal oxide powder according to claim 4 relative to 100 parts by mass of a rubber or a resin and showing a surface resistivity of $10^6$ to $10^{12}$ Ω/cm².

6. The surface-modified metal oxide powder according to claim 1, wherein addition amount of the ionic liquid in the surface treatment of the metal oxide powder is in the range between 0.1 and 20 parts by mass relative to 100 parts by mass of the metal oxide powder.

7. A semiconductive member containing 0.1 to 50 parts by mass of the surface-modified metal oxide powder according to claim 6 relative to 100 parts by mass of a rubber or a resin and showing a surface resistivity of $10^6$ to $10^{12}$ Ω/cm².

8. The surface-modified metal oxide powder according to claim 1, wherein the surface treatment of the metal oxide powder is carried out by concurrent use of the ionic liquid and a surface-modifying agent.

9. The surface-modified metal oxide powder according to claim 8, wherein, in the surface treatment of the metal oxide powder, addition amount of the ionic liquid is in the range between 0.1 and 20 parts by mass relative to 100 parts by mass of the metal oxide powder and addition amount of the surface-modifying agent is in the range between 5 and 50 parts by mass relative to 100 parts by mass of the metal oxide powder.

10. A semiconductive member containing 0.1 to 50 parts by mass of the surface-modified metal oxide powder according to claim 9 relative to 100 parts by mass of a rubber or a resin and showing a surface resistivity of $10^6$ to $10^{12}$ Ω/cm².

11. A semiconductive member containing 0.1 to 50 parts by mass of the surface-modified metal oxide powder according to claim 8 relative to 100 parts by mass of a rubber or a resin and showing a surface resistivity of $10^6$ to $10^{12}$ Ω/cm².

12. The surface-modified metal oxide powder according to claim 1, wherein a specific surface area of the fumed silica is in the range between 20 and 380 m²/g.

13. A semiconductive member containing 0.1 to 50 parts by mass of the surface-modified metal oxide powder according to claim 12 relative to 100 parts by mass of a rubber or a resin and showing a surface resistivity of $10^6$ to $10^{12}$ Ω/cm².

* * * * *

UNITED STATES PATENT AND TRADEMARK OFFICE
CERTIFICATE OF CORRECTION

| | | |
|---|---|---|
| PATENT NO. | : 9,098,001 B2 | Page 1 of 1 |
| APPLICATION NO. | : 13/378691 | |
| DATED | : August 4, 2015 | |
| INVENTOR(S) | : Tashiro et al. | |

It is certified that error appears in the above-identified patent and that said Letters Patent is hereby corrected as shown below:

On the title page item (57), line 4, please change "time of one" to -- time one --

In the claims,

Column 23, line 13 (claim 1, line 9) please change "and to +300" to -- to +300 --

Signed and Sealed this
Fifteenth Day of March, 2016

Michelle K. Lee
*Director of the United States Patent and Trademark Office*